(No Model.)

W. GATES.
HARVESTER TONGUE SUPPORT.

No. 599,126. Patented Feb. 15, 1898.

Witnesses:
F. G. Fischer
G. H. Thorpe

Inventor
Wm Gates,
By Rigdon & Rigdon
Attys.

THE NORRIS PETERS CO., PHOTO-LITHO., WASHINGTON, D. C.

ated February 15, 1898.
UNITED STATES PATENT OFFICE.

WILLIAM GATES, OF MULBERRY, MISSOURI.

HARVESTER-TONGUE SUPPORT.

SPECIFICATION forming part of Letters Patent No. 599,126, dated February 15, 1898.

Application filed September 12, 1896. Serial No. 605,682. (No model.)

*To all whom it may concern:*

Be it known that I, WILLIAM GATES, of Mulberry, Bates county, Missouri, have invented certain new and useful Improvements in Tongue-Supports for Harvesters, of which the following is a full, clear, and exact description, reference being had to the accompanying drawings, forming a part hereof.

My invention relates to tongue-supports for harvesters and other agricultural machines; and my object is to produce a device of this character which is adjustable, to accommodate different vehicles, and which is simple, strong, durable, and cheap of construction.

The invention consists in certain novel and peculiar features of construction and combinations of parts, as will be hereinafter described and claimed.

In order that the invention may be fully understood, I will proceed to describe it with reference to said accompanying drawings, in which—

Figure 1:
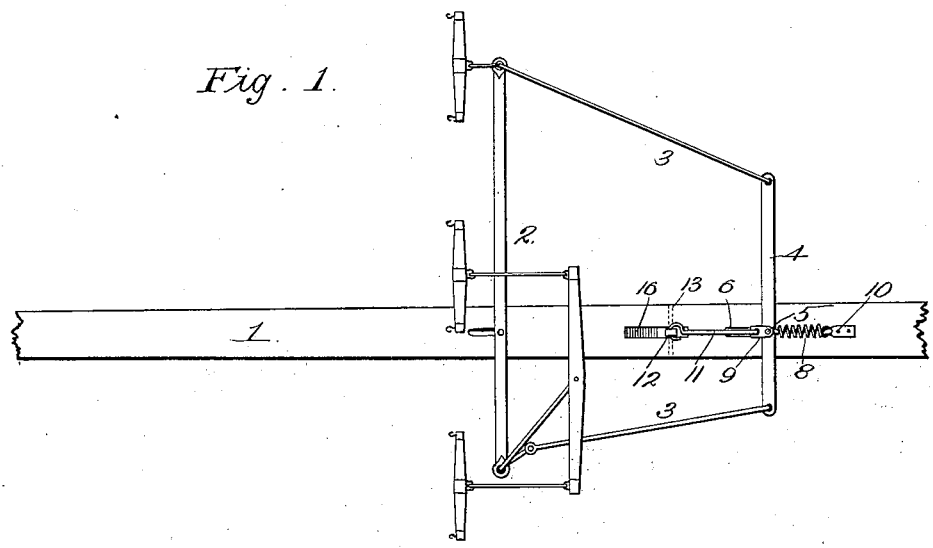
Figure 2:
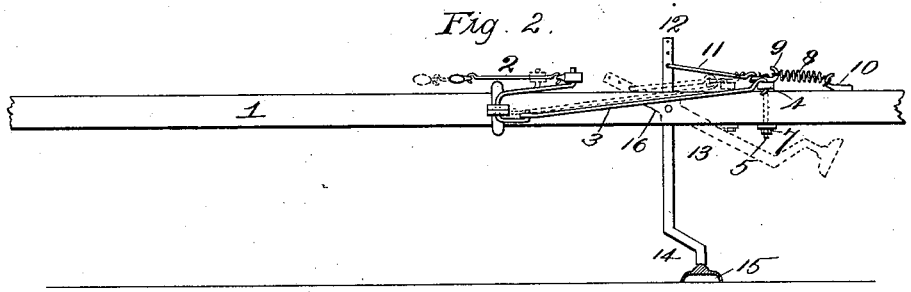

Figure 1 represents a plan view of the tongue of a harvester or other vehicle provided with my improvement. Fig. 2 represents a side elevation of the same.

Like reference-numerals designate corresponding parts in both figures.

1 designates the tongue of a harvester or other vehicle, which is supported at its front end from the necks of the draft-animals. (Not shown.)

2 designates the main bar of the three-horse evener or equalizer shown. Said bar is pivotally mounted upon and has a longitudinally-sliding connection with the tongue and is connected pivotally through the medium of the rearwardly-converging link-rods 3 with the cross-bar 4. Said cross-bar 4 is pivotally mounted upon the bolt 5, extending vertically downward through the longitudinal slot 6 of the tongue, and it is retained in its proper relative position upon said tongue by means of the retaining-nut 7 engaging the lower threaded end of said bolt.

8 designates a retractile spring, which is connected at its front end to the hook-plate 9, mounted upon the cross-bar 4 and the bolt 5, and at its rear end to the hook-plate 10, bolted or otherwise rigidly secured to the tongue. By this arrangement the bolt 5 is held normally at the rear end of the slot 6, and the connected evener or equalizer also occupies its rearward position.

11 designates a link-rod which connects the hook-plate 9 with one or another of a series of apertures in the tongue-support 12, said tongue-support consisting of a bar which is pivotally mounted, as at 13, in an opening or slot in the tongue and is bent rearwardly and downwardly at its lower end, as at 14, and terminates in a large foot-plate 15. The vertical opening in the tongue, in which said tongue-support bar normally extends, is intersected by the longitudinally-extending inclined passage 16, said passage inclining upwardly and forwardly through the tongue. By this arrangement it is obvious that when there is no strain upon the equalizer—that is, when the horses are not pulling forward upon it—the spring 8 holds the bolt 5 in the rear end of the slot 6 and causes the tongue-support bar to assume a vertical position. In such position the enlarged base or foot-plate of said support rests upon the ground and holds the front end of the tongue sufficiently high to take all strain or weight of the tongue and the vehicle from the animals' necks, as will be readily understood. In order that said foot-plate may maintain its position more rigidly and to prevent its settling in the ground, it is formed like an inverted saucer, to provide an air-chamber, which, of course, effectually prevents its sinking into the ground, irrespective of the weight upon it. Immediately the animals begin to move forward, however, the power which they exert overcomes the resistance of the spring 8 and advances the equalizer and the bolt 5, and consequently, through the medium of the link-rod 11, forces the tongue-support bar pivotally to its inoperative position, as shown in dotted lines, Fig. 2. In such position it remains entirely out of the way as long as the strain exerted by the animals is greater than the combined strength of the spring 8 and the tendency of said support to move by gravity to its vertical position. In other words, it occupies such inoperative position as long as the animals are at work and automatically and reliably swings to a vertical position and supports the tongue and lifts the weight from the necks of the animals immediately they cease to pull, as will be readily understood.

From the above description it will be apparent that I have produced a tongue-support which is automatic, which is positive and reliable in operation, which is adjustable to accommodate different vehicles and the different strains which may be imposed by reason of employing a varying number of draft-animals, and which possesses the desirable features of simplicity, strength, and durability of construction.

Having thus described the invention, what I claim as new, and desire to secure by Letters Patent, is—

1. In a tongue-support for harvesters, and like machines, the combination with the movable draft-equalizer, of a sliding bolt connected to said equalizer, a pivoted tongue-support, and a link-rod between said bolt and the upper end of said tongue-support, whereby the latter, when the draft-equalizer is moved forward, swings up from the ground out of the way, substantially as described.

2. In a tongue-support for harvesters and like machines, the combination of a longitudinally-adjustable equalizer, a bolt extending through a longitudinal slot in the tongue of the vehicle, a spring holding said bolt and equalizer normally retracted, and a tongue-support bar pivotally mounted in said opening, and pivotally connected to the upper end of the support, substantially as described.

3. In a tongue-support, the combination with a draft-equalizer, a bolt extending vertically through a longitudinal slot in the tongue, a bar mounted upon said bolt, rods connecting said bar pivotally with the equalizer, a hook-plate mounted upon said bolt, a tongue-support bar pivoted in the tongue to swing in a vertical plane and longitudinally of the machine, a rod pivotally connecting said hook-plate with one or another of a series of openings in the upper end of said bar, and a retractile spring for holding the bar in its vertical position, substantially as described.

4. In a tongue-support, the combination with a draft-equalizer, a bolt extending vertically through a longitudinal slot in the tongue, a bar mounted upon said bolt, rods connecting said bar pivotally with the equalizer, a hook-plate mounted upon said bolt, a tongue-support bar pivoted in the tongue to swing in a vertical plane and longitudinally of the machine, and bent rearwardly and downwardly at its lower end and provided with a hollow foot-plate, a rod connecting said hook-plate with one or another of a series of openings in the upper end of said bar, and a retractile spring for holding the upper end in its vertical position, substantially as described.

In testimony whereof I affix my signature in presence of two witnesses.

WILLIAM GATES.

Witnesses:
G. Y. THORPE,
M. A. MURRAY.